No. 12,347. REISSUED MAY 16, 1905.

K. KIEFER.

FILTER.

APPLICATION FILED MAR. 13, 1905.

Witnesses.

E. G. Appleton

Chas. L. Richter

Inventor.

Karl Kiefer

No. 12,347. Reissued May 16, 1905.

UNITED STATES PATENT OFFICE.

KARL KIEFER, OF CINCINNATI, OHIO.

FILTER.

SPECIFICATION forming part of Reissued Letters Patent No. 12,347, dated May 16, 1905.

Original No. 782,200, dated February 7, 1905. Application for reissue filed March 13, 1905. Serial No. 249,974.

*To all whom it may concern:*

Be it known that I, KARL KIEFER, a citizen of the United States, and a resident of Cincinnati, in the county of Hamilton and State of Ohio, have invented certain new and useful Improvements in Filtering Apparatus for the Separation of Solids from Liquids, of which the following is a specification.

My invention relates to filters comprising a series of superimposed filter elements; and its novelty consists in the means of arranging the elements, assembling them, and securing them and their connections in place.

In my application for Letters Patent of the United States filed by me April 29, 1901, Serial No. 57,970, granted to me January 10, 1905, No. 779,607, I describe a filter comprising a series of superimposed filter elements, capillary inlet and outlet liquid-ways, and means for supporting the filter elements. In the same application I describe but do not claim a novel means for securing the filter elements tightly in position after assembling same. I also describe but do not claim a novel modification of the filtering elements which form the subject-matter of this specification.

Figure 1:
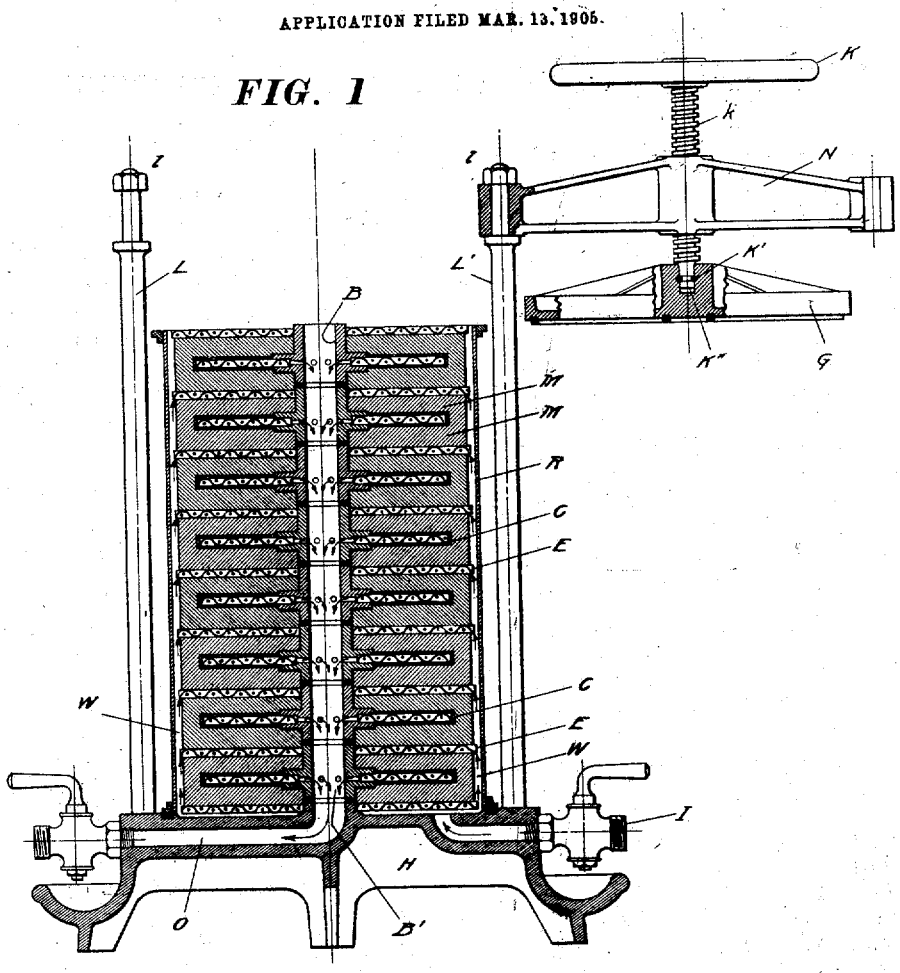
Figure 2:
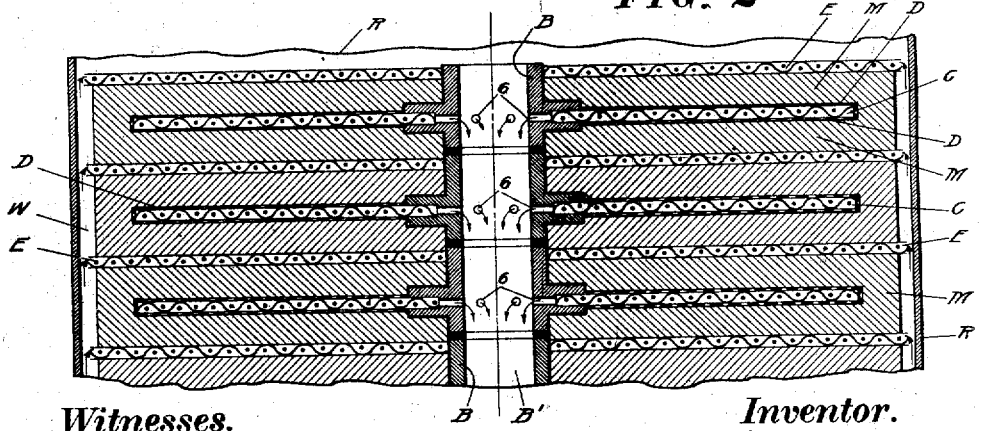

In the drawings, Figure 1 is a vertical central section of my improved filter. Fig. 2 is an enlarged section through some of the filter elements.

In the drawings each filter element is shown as composed of two layers M of filter mass, one arranged on each side of the horizontally-placed woven-wire screen C, provided with intermediate protecting-sheets D D of flannel or other suitable material. On each side of each element is arranged a horizontally-placed coarse woven-wire screen E. The screens C and E and the layers of pulp are supported from central hubs B, provided with projecting flanges, which embrace and carry the screens. Each hub is provided with a central vertical opening B′ and with radial passages 6 6, communicating with it and screen C.

R is an inclosing external drum, between which and the filter elements is a vertical annular inlet-passage W, communicating with screens E E and hub B, that embraces and supports screens C C and provided with passages 6 6, connected, by means of central opening B′, with the outlet-passage O on the base-plate or platform H, made of cast-iron or some other suitable material.

I is an inlet-passage communicating with the annular space W.

Secured to the base H and projecting upward are two posts L and L′. At their upper extremities they are secured by nuts *l* or other suitable means to a transverse yoke N, provided with a central threaded aperture to engage with a vertical screw *k*, provided at its upper end with a hand-wheel K or some other means for securing its rotation. At the lower end of the screw *k* is secured a cover-plate G, adapted to rotate horizontally by means of a packing-ring or ball-bearing *k′*, embraced by grooves in the cover and shank *k″* of the screw. The cover fits water-tight by means of gaskets on the top of the drum R and also on the top of the uppermost boss B to the top filtering elements.

The method of assembling the form of filter as described is as follows: The filter layers are formed outside of the filter in a suitable mold. The lower layer is first made, then the screen C, hub B are placed in position, and the upper layer is formed on top of the screen C. The forming of the pulp mass M may be done by means known in the art, which consist in dissolving the filter mass to a thin soup, using a cylindrical external mold of the largest diameter of the filtering layer and an internal central mold of the smallest diameter of the filtering layer and expressing the water out of this thin mass by means of a top press-plate fitting between the ring-shaped space between the two cylindrical molds. The diameter of the screen C being less than the filtering layers and the pulp of the upper filter layer being wet when poured on the lower filter layer and dissolving the latter somewhat when poured in, the two layers on each side of the screen C will be interlaced in an annular area of contact, as shown in the drawings. After the two filtering layers are interlaced they are covered with a dividing-screen E, and this constitutes one filtering element. To place the screens together, one of the screens E is first placed on the base-plate H. Then the filter element as formed above is placed above it. Then another filter element formed in the same manner is placed above that until they are all placed in position. This position is indicated by Fig. 1. It remains now to close the filter, which is done by swinging the transverse yoke N in position and forcing the screw downward by means of the hand-wheel K. The height of the hubs together must be exactly the height of the external drum R, as shown in Fig. 1, whereupon the cover G will close the hubs and drum simultaneously.

What I claim as my invention, and desire to secure by Letters Patent, is—

1. The combination with a series of superimposed filter elements resting upon a base, of an external drum, a cover adapted to fit snugly over the drum, swing-support for cover attached to the filter and the same means for simultaneously forcing the cover downward and upon the drum and filter elements.

2. The combination with a series of superimposed filter elements having central intercommunicating opening, of a base, an external drum, and a cover in contact with the uppermost filter elements and sealing the drum.

3. The combination with a series of superimposed filter elements resting upon a base, provided with an inlet and outlet passage, of an external drum, of a framework supported from the base, a yoke carried thereby, a cover adapted to fit snugly on top of the uppermost filter elements and drum and means for forcing the cover downward.

4. The combination of a series of superimposed filter elements resting upon a base, provided with inlet and outlet passages, of an external drum, of a framework supported from the base, a yoke carried thereby, a cover adapted to fit snugly on top of the uppermost filter element and drum, and means for forcing the cover downward consisting of a screw adapted to rotate in a threaded aperture in said yoke.

5. In a filter, the combination with a drum or casing, of circular filter layers of compressed pulp, pairs of which are interlaced with each other in an annular area at their periphery, said filter layers of a diameter somewhat smaller than the casing, whereby clear space is produced not obstructed by any other part of the filter, for circulation of the liquid between the inside of the casing and the peripheral fibers of the filter mass.

6. The combination of a drum or casing with inlet and outlet openings, of circular filter layers of compressed pulp of a diameter somewhat smaller than the casing, pairs of said layer being connected at their periphery so as to prevent the passage of unfiltered liquid through the place of connection, embedding between themselves a liquid-conductor, centrally and rigidly supported by means affording a communicating passage between all of said liquid-conductors and the outlet-openings in the casing.

7. In a filter, the combination with a casing or drum containing a series of superimposed filter elements having central intercommunicating openings, of the same means for sealing the drum and bearing upon the filter elements.

8. The combination with a series of superimposed filter elements having central intercommunicating openings, of an external drum and cover in contact with the uppermost filter elements and sealing the drum.

9. The combination with a series of superimposed filter elements having central intercommunicating openings, of an external drum, a screw arrangement for simultaneously forcing the cover downward upon the drum, and bearing upon the filter elements.

10. The combination with a series of superimposed filter elements resting upon a base, of an external drum, of upright posts secured to said base, a transverse yoke supported by said posts, a cover for the filter, and means for forcing the cover away from the yoke and against the drum.

11. The combination with a series of superimposed filter elements, resting upon a base, of an external drum, and a cover adapted to fit snugly over the drum, means for supporting the cover, a yoke with which a screw engages and which is supported from the framework of the apparatus, and means to force the screw downward.

12. The combination with a series of superimposed filter elements resting upon a base, of an external drum, and a cover adapted to fit snugly over the drum, means for supporting the cover when not in use and means for forcing the same downward upon the drum and filter elements, consisting of a screw centrally arranged.

13. The combination with a series of superimposed filter elements resting upon a base, of a drum surrounding said filter elements, of upright posts secured to said base, a transverse yoke supported by said posts, a cover for the filter suspended from the yoke, and means for forcing the cover downward.

14. The combination with a series of superimposed filter elements resting upon a base, of a drum surrounding said filter elements, of upright posts secured to said base, a transverse yoke supported by said posts, a cover for the filter, and means for forcing the cover downward upon the drum and elements simultaneously.

15. The combination with a base-plate provided with suitable inlet and outlet passages, a series of superimposed filter elements resting thereon, upright posts secured to said base-plate, a surrounding drum, and a cover adapted to be swung away from the filter elements.

16. The combination with a series of superimposed filter elements resting upon a base, of an external drum, and a cover adapted to fit snugly over the drum, means for supporting the cover, a yoke with which a screw engages and which is supported from the framework of the apparatus, and means centrally arranged to force the screw downward.

17. The combination with a series of superimposed filter elements resting upon a base, of an external drum, of upright posts secured to said base, of a cover for the filter suspended from the yoke and means for forcing the cover downward consisting of a screw adapted to rotate in a threaded aperture in said yoke, and means for producing such rotation.

18. The combination with a series of superimposed filter elements resting upon a base, of an external drum, of upright posts secured to said base, a transverse yoke hinged to one of said posts, and provided with means for fastening it to another of said posts, a cover for the filter, and means for forcing the cover downward against the uppermost filter elements and drum.

19. The combination with a series of superimposed filter elements, resting upon a base provided with an inlet and outlet passage, of an external drum, of a framework connected to the base, a yoke carried thereby, a cover adapted to fit snugly on top of the uppermost filter element and drum, and means for forcing the cover downward.

20. The combination with a series of superimposed filter elements resting upon a base, provided with inlet and outlet passages, of an external drum, of a framework connected to the base, a yoke carried thereby, a cover adapted to fit snugly on top of the uppermost filter element and drum, and means for forcing the cover downward consisting of a screw adapted to rotate in a threaded aperture in said yoke, and means for producing such rotation.

21. In a filter, the combination of a base or bottom supporting a series of superimposed filter elements, a cylindrical drum surrounding said filter elements and tightly connected to said base or bottom, of a cover to close said cylindrical drum, of upright posts for the taking up of the internal strain between bottom and cover, of a transverse yoke hinged to one of said posts, and fastening to the other, for transmitting the strain on the cover to both said posts.

22. The combination with a series of superimposed filter elements resting upon a base, a drum surrounding said filter elements, of upright posts secured to said base, a transverse yoke hinged to one of said posts, and provided with means for fastening it to another of said posts, a cover for the filter, and means for forcing the cover downward against the uppermost filter element and drum.

23. The combination with a series of superimposed filter elements resting upon a base provided with an inlet and outlet passage, of a drum surrounding said filter elements, and of a framework connected to the base, a yoke carried thereby, a cover adapted to fit snugly on top of the uppermost filter element and drum, and means for forcing the cover downward.

24. In a filter, the combination with a drum or casing, of circular filter layers of compressed pulp, pairs of which are interlaced with each other in an annular area at their periphery, of liquid-conductors for the supply and discharge of the liquid, interposed between said filter layers, of central hubs forming a communicating passage, of central projecting flanges parallel to the filter layers and in contact with the annular central edge of said filter layers.

25. In a filter, the combination with a drum or casing, of circular filter layers of compressed fibrous pulp, pairs of which are connected with each other in an annular area at their periphery, of liquid-conductors for the supply and discharge of the liquid, interposed between said filter layers, of central non-porous means for connecting pairs of filter layers alternating with the previous-mentioned pairs, said non-porous means adapted to prevent the passing of the unfiltered liquid between the last-mentioned pairs of filter layers into the central conduit.

KARL KIEFER.

Witnesses:
E. J. APPLETON,
CHAS. L. RICHTER.